United States Patent
Abrol et al.

(10) Patent No.: US 6,542,734 B1
(45) Date of Patent: Apr. 1, 2003

(54) METHOD AND APPARATUS FOR DETECTING SPECIFIED EVENTS IN A MOBILE STATION

(75) Inventors: Nischal Abrol, San Diego, CA (US); Harold Gilkey, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/539,498

(22) Filed: Mar. 30, 2000

(51) Int. Cl.[7] ................................................. H04M 3/42
(52) U.S. Cl. ...................... 455/414; 455/412; 455/580; 370/363; 370/449; 379/229; 379/220.01
(58) Field of Search ................................ 455/414, 422, 455/412, 445, 550, 575; 370/449, 450, 351, 368, 363; 379/229, 220, 220.01

(56) References Cited

U.S. PATENT DOCUMENTS 5,537,404 A * 7/1996 Bentley et al. ............. 370/351
6,044,275 A   3/2000 Boltz et al.
6,122,671 A * 9/2000 Farrar et al. .............. 370/913

OTHER PUBLICATIONS

Floreani, et al., "Application of the Stratification Concept to Radio Networks and Their Gateways", Dec. 15, 1994, Computer Networks and ISDN Systems, pps. 675–687.

* cited by examiner

Primary Examiner—Doris H. To
(74) Attorney, Agent, or Firm—Philip R Wadsworth; Charles D Brown; Howard H. Seo

(57) ABSTRACT

The present invention discloses a method and apparatus for detecting a specified event in a wireless communication system. The present invention includes an application program interface (API) that facilitates communications between a mobile station communication protocol stack, which communicates with a communication network, and a mobile station application. The mobile station communication protocol stack polls a memory when the mobile station application registers a specified event. Based on the polling, the mobile station communication protocol stack then detects the specified event. In another implementation of the present invention, the mobile station communication protocol stack detects the specified event by an interrupt notice, which is triggered when the specified event occurs.

27 Claims, 10 Drawing Sheets

METHOD AND APPARATUS FOR DETECTING SPECIFIED EVENTS IN A MOBILE STATION

BACKGROUND

1. Field of the Invention

This invention generally relates to the field of wireless communications. More particularly, the present invention relates to a novel method and apparatus for detecting a specified event in a wireless communication system.

2. Description of Related Art

A. Wireless Communications

Recent innovations in wireless communication and computer-related technologies, as well as the unprecedented growth of Internet subscribers, have paved the way for mobile computing. In fact, the popularity of mobile computing has placed greater demands on the current Internet infrastructure to provide mobile users with more support. The life blood of this infrastructure is the packet-oriented Internet Protocol (IP) which provides various services, including the addressing and routing of packets (datagrams) between local and wide area networks (LANs and WANs). IP protocol is defined in Request For Comment 791 (RFC 791) entitled, "INTERNET PROTOCOL DARPA INTERNET PROGRAM PROTOCOL SPECIFICATION," dated September 1981.

The IP protocol is a network layer protocol that encapsulates data into IP packets for transmission. Addressing and routing information is affixed to the header of the packet. IP headers, for example, contain 32-bit addresses that identify the sending and receiving hosts. These addresses are used by intermediate routers to select a path through the network for the packet towards its ultimate destination at the intended address. Thus, the IP protocol allows packets originating at any Internet node in the world to be routed to any other Internet node in the world. On the other hand, a transport layer, which comprises either a Transmission Control Protocol (TCP) or a User Datagram Protocol (UDP), is used to address to particular applications.

The current trend is for mobile users to use mobile computers, such as laptop or palmtop computers, in conjunction with wireless communication devices, such as cellular or portable phones, to access the Internet. That is, just as users conventionally employ "wired" communication devices to connect their computers to land-based networks, mobile users will use wireless communication devices, commonly referred to as "mobile stations" (MSs), to connect their mobile terminals to such networks. As used herein, the mobile station or MS will refer to any subscriber station in the public wireless radio network.

FIG. 1 (Prior Art) illustrates a high-level block diagram of a wireless data communication system in which the MS 110 communicates with an Interworking Function (IWF) 108 via a Base Station/Mobile Switching Center (BS/MSC) 106. The IWF 108 serves as the access point to the Internet. IWF 108 is coupled to, and often co-located with, BS/MSC 106, which may be a conventional wireless base station as is known in the art. Another standard protocol that addresses the wireless data communication system is the 3$^{rd}$ Generation Partnership Project 2 ("3GPP2") entitled "WIRELESS IP NETWORK STANDARD," published in December 1999. The 3G Wireless IP Network Standard, for example, includes a Packet Data Serving Node ("PDSN"), which functions like the IWF 108.

There are various protocols that address the data communications between the MS 110 and the IWF 108. For example, Telecommunications Industry Association (TIA)/Electronics Industries Association (EIA) Interim Standard IS-95, entitled "MOBILE STATION-BASE . STATION COMPATIBILITY STANDARD FOR DUAL-MODE WIDEBAND SPREAD SPECTRUM CELLULAR SYSTEM," published in July 1993, generally provides a standard for wideband spread spectrum wireless communication systems. Moreover, standard TIA/EIA IS-707.5, entitled "DATA SERVICE OPTIONS FOR WIDEBAND SPREAD SPECTRUM SYSTEMS: PACKET DATA SERVICES," published in February 1998, defines requirements for support of packet data transmission capability on TIA/EIA IS-95 systems and specifies packet data bearer services that may be used for communication between the MS 110 and the IWF 108 via the BS/MSC 106. Also, the TIA/EIA IS-707-A.5 standard, entitled "DATA SERVICE OPTIONS FOR SPREAD SPECTRUM SYSTEMS: PACKET DATA SERVICES," and the TIA/EIA IS-707-A.9 standard, entitled "DATA SERVICE OPTIONS FOR SPREAD SPECTRUM SYSTEMS: HIGH-SPEED PACKET DATA SERVICES," both published in March 1999, also define requirements for packet data transmission support on TIA/EIA IS-95 systems. In addition, another standard protocol that addresses communications between the MS 110 and the IWF 108 is the TIA/EIA IS-2000, entitled "INTRODUCTION TO CDMA 2000 STANDARDS FOR SPREAD SPECTRUM SYSTEMS," published in July 1999.

IS-707.5 introduces communication protocol option models between the MS 110 and the BS/MSC 106 (the Um interface), and between the BS/MSC 106 and the IWF 108 (the L interface). For instance, a Relay Model represents the situation where a Point to Point Protocol (PPP) link exists on the Um interface between the MS 110 and the IWF 108. The PPP protocol is described in detail in Request for Comments 1661 (RFC 1661), entitled "THE POINT-TO-POINT PROTOCOL (PPP)."

FIG. 2 (Prior Art) is a diagram of the protocol stacks in each entity of the IS-707.5 Relay Model. At the far left of the figure is a communication protocol stack, shown in conventional vertical format, showing the protocol layers running on the MS 110. The MS 110 protocol stack is illustrated as being logically connected to the BS/MSC 106 protocol stack over the Um interface. The BS/MSC 106 protocol stack is, in turn, illustrated as being logically connected to the IWF 108 protocol stack over the L interface.

The operation depicted in FIG. 2 is as follows: an upper layer protocol 200 entity, such as an application program running on the MS 110, has a need to send data over the Internet. A representative application may be a web browser program (e.g., Netscape Navigator™, Microsoft Internet Explorer™). The web browser requests a Universal Resource Locator (URL), such as HYPERLINK "http://www.Qualcomm.com/". A Domain Name System (DNS) protocol, also in the upper layer protocol 200, translates the textual host name www.Qualcomm.com to a 32-bit numeric IP address by the use of a domain name resolution, which translates names to addresses in the Internet. The Hypertext Transfer Protocol (HTTP), which is also an upper layer protocol 200, constructs a GET message for the requested URL, and specifies that TCP will be used to send the message and for HTTP operations. The transport layer 202 uses port 80, which is known in the art, as the destination port to route the HTTP operations to the application.

The TCP protocol, which is a transport layer protocol 202, opens a connection to the IP address specified by DNS and transmits the application-level HTTP GET message. The TCP protocol specifies that the IP protocol will be used for message transport. The IP protocol, which is a network layer protocol 204, transmits the TCP packets to the IP address specified. The PPP, which is a link layer protocol 206, encodes the IP packets and transmits them to the relay layer protocol 208. An example of the relay layer protocol 208 may be the illustrated TIA/EIA-232F standard, which is defined in "INTERFACE BETWEEN DATA TERMINAL EQUIPMENT AND DATA CIRCUIT-TERMINATING EQUIPMENT EMPLOYING SERIAL BINARY DATA INTERCHANGE," published in October 1997. It is to be understood that other standards or protocols known to artisans of ordinary skill in the art may be used to define the transmission across the layers. For example, other applicable standards may include the "UNIVERSAL SERIAL BUS (USB) SPECIFICATION, Revision 1.1," published in September 1998, and the "BLUETOOTH SPECIFICATION VERSION 1.0A CORE," published in July 1999. Last, the relay layer protocol 208 passes the PPP packets to a Radio Link Protocol (RLP) 210 and then to the IS-95 protocol 212 for transmission to the BS/MSC 106 over the Um interface. The RLP protocol 210 is defined in the IS-707.2 standard, entitled "DATA SERVICE OPTIONS FOR WIDEBAND SPREAD SPECTRUM SYSTEMS: RADIO LINK PROTOCOL," published in February 1998, and the IS-95 protocol is defined in the IS-95 standard identified above.

A complementary relay layer protocol 220 on the BS/MSC 106 receives the PPP packets over the Um interface through a IS-95 layer 218 and then a RLP layer 216. The relay layer protocol 220 passes them over the L interface to a relay layer protocol 228 on the IWF 108. A PPP protocol link layer 226 on the IWF 108 receives the PPP packets from the relay layer protocol 228, and terminates the PPP connection between the MS 110 and the IWF 108. The packets are passed from the PPP layer 226 to a IP layer 224 on the IWF 108 for examination of the IP packet header for final routing, which in this scenario is www.Qualcomm.com.

Assuming that the ultimate destination of the IP packets generated by the MS 110 is not the IWF 108, the packets are forwarded through the network layer protocols 224, and link layer protocols 225 to the next router (not shown) on the Internet. In this manner, IP packets from the MS 110 are communicated through the BS/MSC 106, and the IWF 108 towards their ultimate intended destination in the Internet in accordance with the IS-707.5 standard relay model.

Before the MS 110 packets reach their destination, the data link connection must be established first. As specified in RFC 1661, this requires each end of the point-to-point link (i.e., the PPP protocols 206 and 226) to first send PPP Link Control Protocol (LCP) packets in order to establish, configure and test the data link connection. After the link has been established by the LCP, the PPP protocol 206 may then send Network Control Protocol (NCP) packets to configure the network layer protocols 204 and 224. The NCP for IP in PPP links is the IP Control Protocol (IPCP). IPCP is described in detail in Request for Comment 1332 (RFC 1332), entitled "THE PPP INTERNET PROTOCOL CONTROL PROTOCOL (IPCP)," published in May 1992. Before IPCP negotiation, however, an authentication phase may be needed. After each of the network layer protocols has been configured, packets from each network layer protocol can be sent over the link between them.

B. Application Program Interface

Most, if not all, of the processes supporting the communication protocol stack on the MS 110 are executed by application programs. Generally, conventional data networks employ application program interfaces (APIs) to enable application programs running on one computer to communicate with application programs running on another computer. The APIs utilize "sockets," which shelter the invoking applications from differences in the protocols of the underlying network. To achieve inter-networked communications, APIs comprise functions, which allow the applications, for example, to open a socket, transmit data to the network, receive data from the network, and close the socket. Common network programming interfaces include Berkeley Systems Development (BSD) sockets interface, which operates under a Unix™ operating system, and Windows™ Sockets Interface (WinSock™), which operates under a Windows™ operating system.

Because neither BSD sockets nor WinSock™ supports the communication protocol stack on the wireless MS 110 (see FIG. 2), a novel API supporting such a stack is needed. In particular, what is needed is a novel method and apparatus for detecting a specified event in a wireless communication system.

SUMMARY OF THE INVENTION

The present invention addresses the need identified above by providing a method and apparatus for detecting a specified event in a wireless communication system. In one implementation, the present invention includes an application program interface (API) that facilitates communications between a mobile station communication protocol stack, which communicates with a communication network, and a mobile station application. The mobile station communication protocol stack polls a memory when the mobile station application registers a specified event. The mobile station communication protocol stack then detects the specified event based on the polling. In another implementation of the present invention, the mobile station communication protocol stack detects the specified event by an interrupt notice, which is triggered when the specified event occurs.

DETAILED DESCRIPTION

The embodiments of the present invention may be realized in a variety of implementations, including software, firmware, and/or hardware. Hence, the operation and behavior of the present invention will be described without specific reference to the software code or hardware components, it being understood that a person of ordinary skill in the art would be able to design software and/or hardware to implement the present invention, which detects a specified event, based on the description herein.

Figure 1:
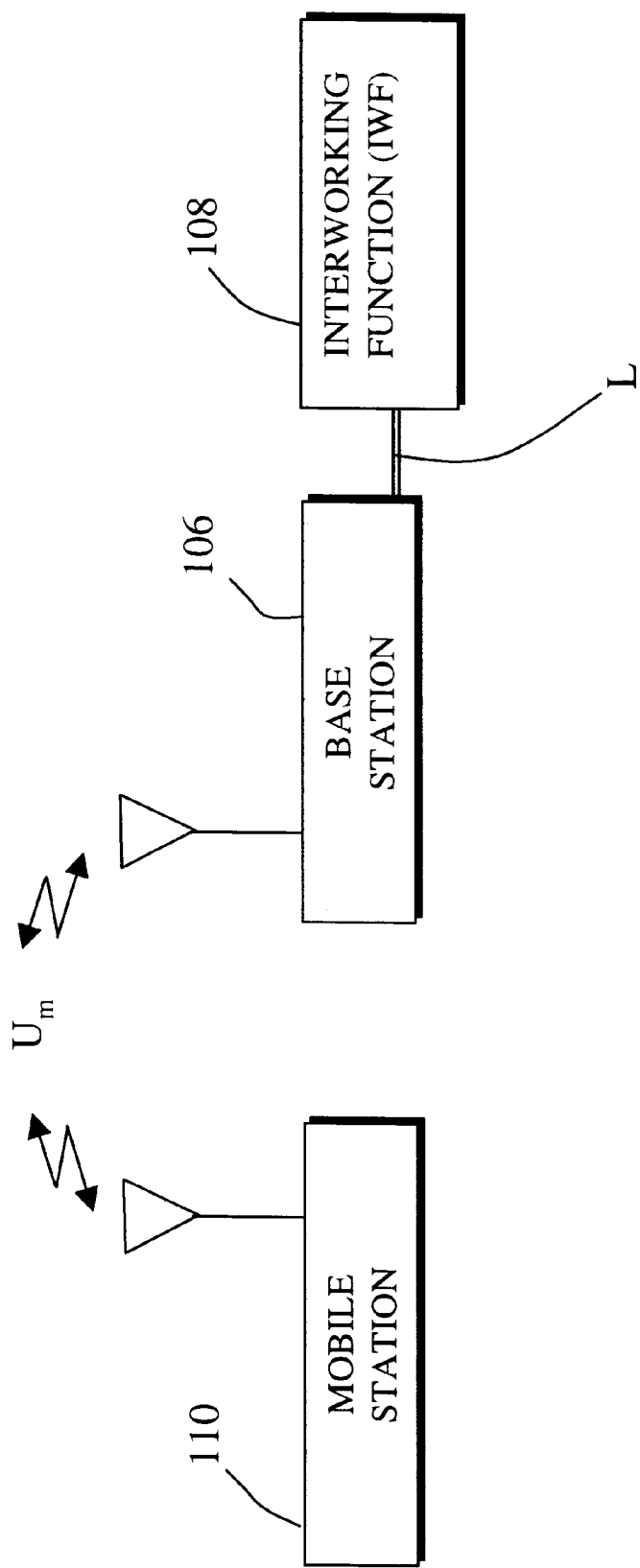
FIG. 1 (Prior Art) is a high level block diagram of a wireless communication system in which a mobile station connects to the Internet.
Figure 2:
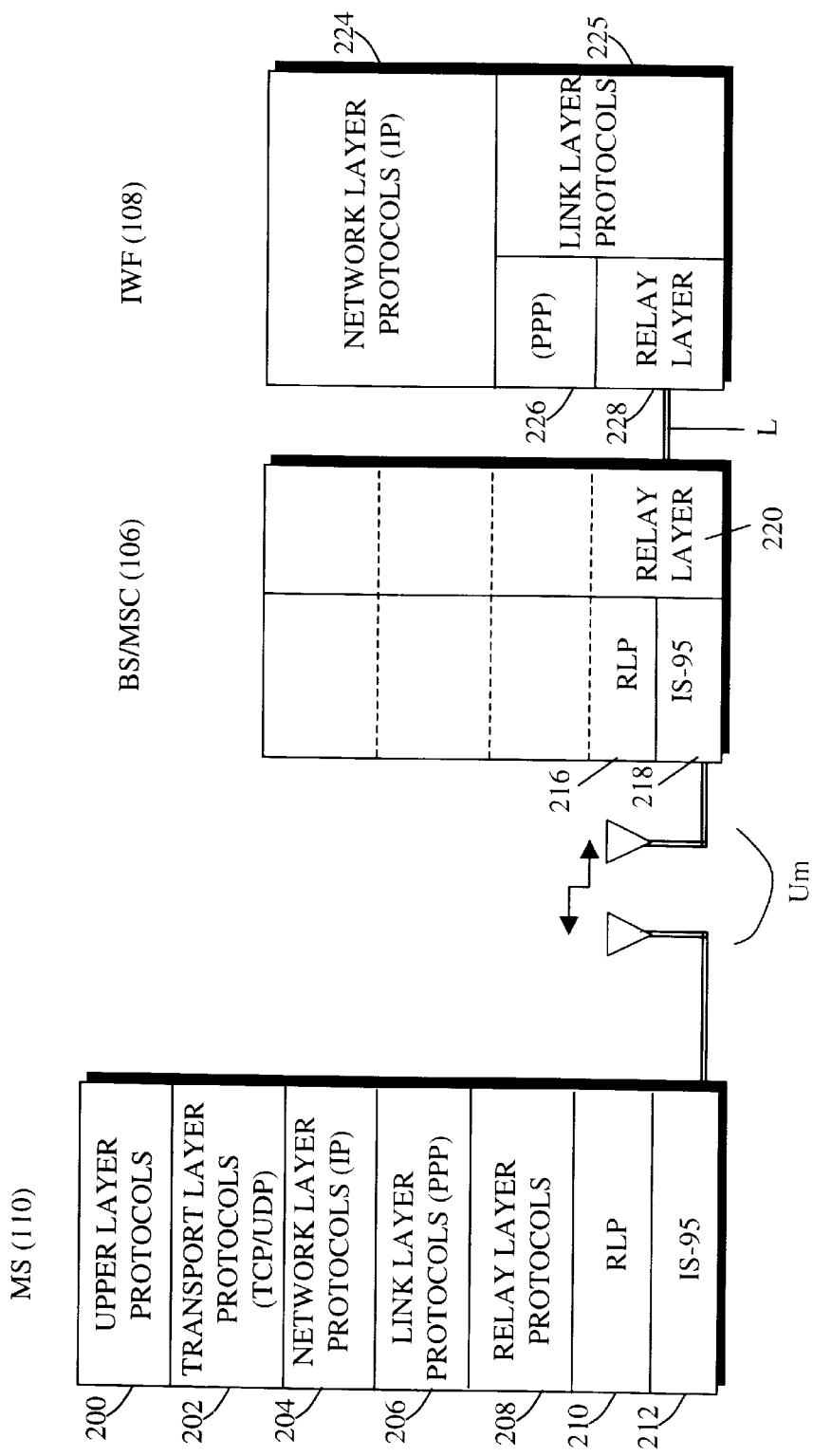
FIG. 2 (Prior Art) schematically describes the protocol stacks in each entity of the TIA/EIA IS-707.5 Relay Model.
Figure 3:
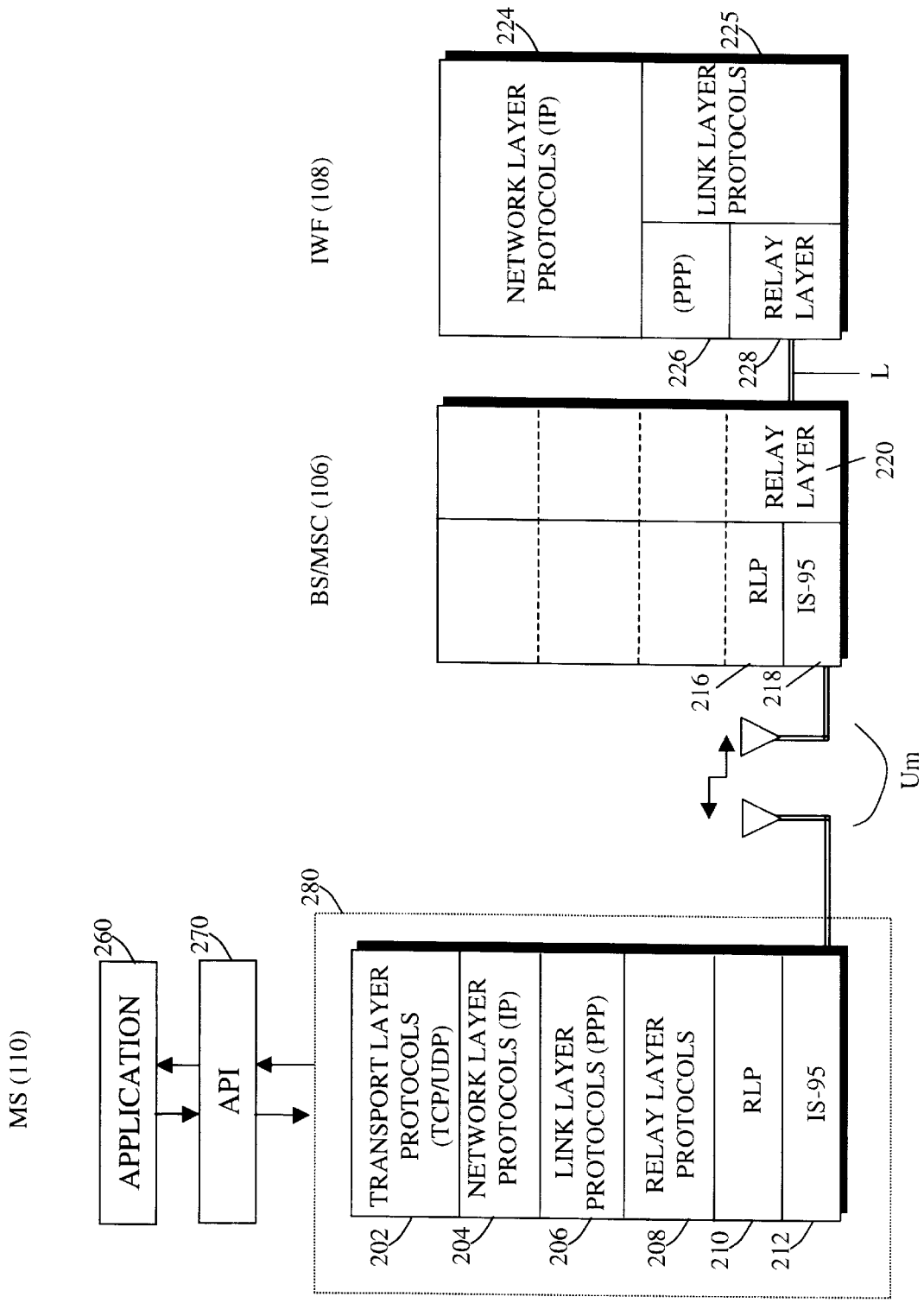
FIG. 3 schematically depicts features of an embodiment of the present invention.

FIG. 3 depicts an application 260, a communication protocol stack 280, and an API 270 within a MS 110.

Application 260 and communication protocol stack 280 (i.e., protocol layers 202, 204, 206, 208, 210, 212) communicate through function calls, which are provided by API 270. In other words, API 270 allows application 260 and communication protocol stack 280 to run on different processors and operating systems without compromising functionality. One skilled in the art would appreciate that various names for the invoked functions are possible without departing from the scope of the present invention.

It should be noted that communication protocol stack 280 contains a plurality of send queues and receive queues, which store data. Output functions read data from a memory of application 260 to store the data into one of the send queues of communication protocol stack 280. Input functions read data from one of the receive queues of communication protocol stack 280 to store the data into the memory of application 260.

To illustrate operation, the MS 110 receives IP packets. The communication protocol stack 280 of the MS 110 unencapsulates the IP packets, and passes them to the transport layer 202 (see FIG. 3). A field in the IP packet header indicates the transport, which may be either TCP or UDP. Based on the destination port number specified in the transport layer header, the data is routed to the appropriate receive queue of communication protocol stack 280, which corresponds to a particular socket. The data may then be transmitted to application 260.

In certain situations, it may be desirable to operate with packets that bypass various layers of the protocol stack 280 to reduce latency effects. Such packets include raw packetized data, such as raw IP packets, which lack destination information (i.e., destination port number). As such, the destination application may not be determined from the raw IP packets. In such situations, communication protocol stack 280 may transmit the received raw IP packets to all sockets registered to support the IP protocol, for example. This allows the payload data to be transmitted to the destination application. An Internet Control Messaging Protocol (ICMP) parsing engine, which responds to IP packets, may also receive the raw packetized data. The well-known ICMP parsing engine is defined in RFC 792, entitled "INTERNET CONTROL MESSAGE PROTOCOL." It should be apparent from this description that communication protocol stack 280, for example, processes the received packets before it passes them up the stack to application 260, which reduces the amount of unencapsulation to be done by application 260.

Conversely, application 260 may transmit raw packetized data over the Um interface by using the sockets, which facilitates communications between communication protocol stack 280 and application 260. Further, application 260 may transmit raw packetized data over the Um interface. In turn, communication protocol stack 280 encapsulates the packetized or raw packetized data, for example, into IP packets and transmits them over the Um interface. In this example, communication protocol stack 280 provides a IP header and a checksum in order to generate the IP packets. For ICMP, on the other hand, a specified protocol type may be copied into the IP header.

As stated above, application 260 may create a socket that allows data communications between at least one of the protocol layers 202, 204, 206, 208, 210, 212 and application 260 to reduce the latency inherent in the use of communication protocol stack 280. That is, application 260 may create a socket that bypasses the transport layer 202, the network layer 204, and the link layer 206, and thus allows application 260 to transmit payload data to, or receive payload data from, the RLP layer 210. Also, application 260 may create a socket that allows application 260 to transmit payload data to, or receive payload data from, the IS-95 layer 212.

In one embodiment, application 260 calls a function open_netlib( ) to open communication protocol stack 280 and to assign an application identification. The application identification allows multiple applications to communicate with communication protocol stack 280 (i.e., multi-tasking). As part of the call to function open_netlib( ), for example, application 260 specifies a pointer to a network callback function and to a socket callback function. The network callback function is invoked to inform application 260 whenever network subsystem specified events, such as read from, write to, and close the traffic channel (i.e., Um) and/or a link-layer (i.e., PPP 206), have occurred (or have been enabled). The socket callback function is invoked to inform application 260 whenever socket specified events, such as read from, write to and close the transport layer (i.e., TCP), have occurred (or have been enabled). It should be apparent to one skilled in the art that a communication network comprises at least one of the traffic channel, the link-layer, and the transport layer.

Once communication protocol stack 280 has been opened, a function pppopen( ) is called to initiate a network subsystem connection, which includes the traffic channel and the link-layer. This is an application-wide call, which is not dependent on an individual socket. It, however, requires the application identification. Upon the establishment or failure of the network subsystem connection, the network callback function is invoked to provide a specified event notification. The network subsystem fails, for example, if the traffic channel is not established. Further, the network subsystem characteristics may be set with a call to function net_ioctl( ). This call, for example, may specify the data rate of the sockets.

Once the network subsystem connection is established, a socket (or sockets) can be created and initialized through a call to function socket( ). Before the socket functions can be used, however, the call to function socket( ) may return a socket descriptor. Then, application 260 may call a function async_select( ) to register specified events to receive asynchronous notification. This registration may be implemented by application 260, as part of the function call, to specify the socket descriptor and a bit mask (i.e., multiple events OR'ed together) of the specified events requiring notification. If a specified event occurs (i.e., it is enabled), and it is detected by communication protocol stack 280 or API 270, for example, the socket callback function is invoked to provide asynchronous notification. The callback function may notify application 260 of the specified event by the use of a signal, a message, including a message over remote procedure call (RPC), or a hardware or software interrupt.

Once application 260 is notified of the specified event, then it may call function getnextevent( ) to determine the specified events to service. This function returns a mask of the specified events that occurred for the specified socket descriptor. Also, it clears the bits in the mask of the specified events that occurred. Thus, application 260 may no longer receive notification of the disabled specified events. Application 260 must re-register (i.e., re-enable) these specified events through a subsequent call to function async_select( ).

In addition, application 260 may change the specified events registered for by clearing corresponding bits in the bit mask of specified events. If the bit is already cleared in the bit mask, then the request is simply ignored. In short, event notification may be disabled on a per-event basis, for example, through a all to function async_deselect( ).

Figure 4:
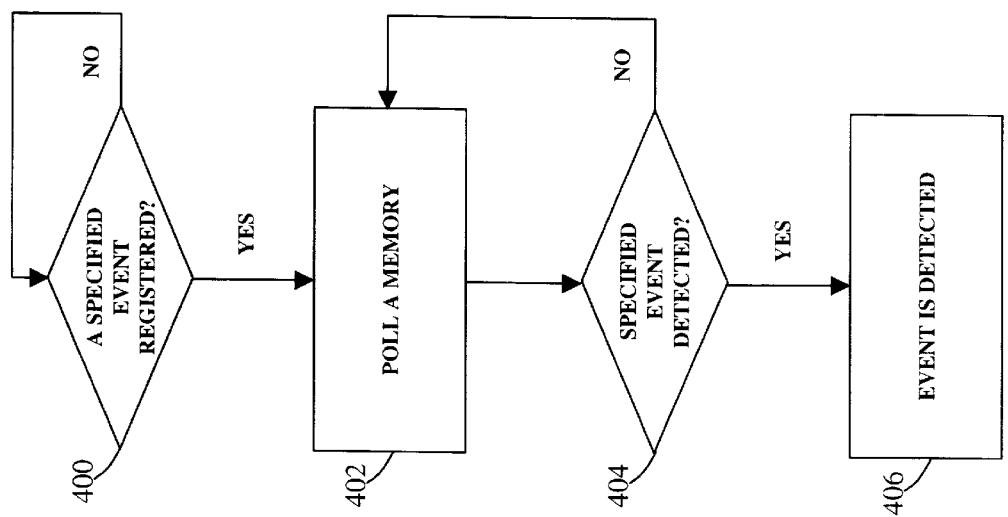
FIGS. 4 and 5 are flow charts for detecting a specified event.
Figure 5:
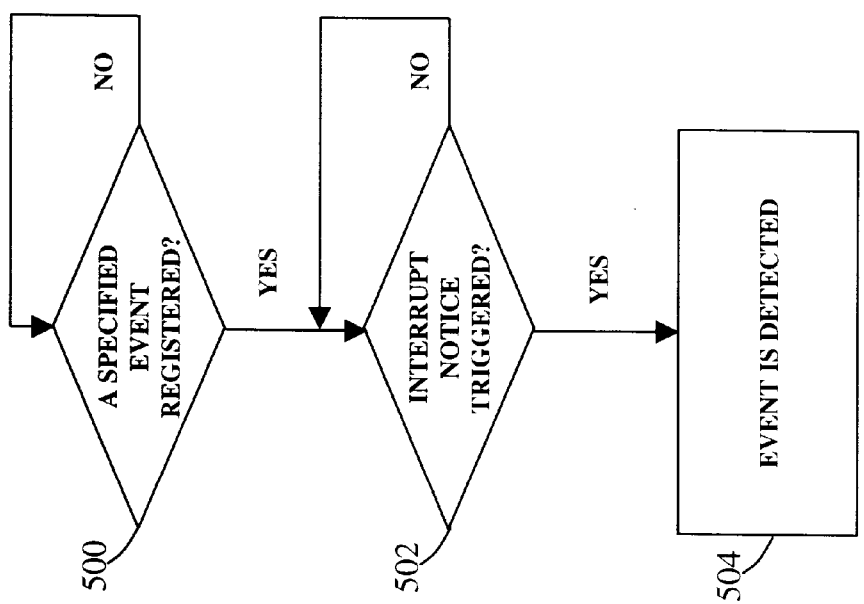

FIGS. 4 and 5 are flow charts for detecting the specified events. As shown in FIG. 4, for example, communication protocol stack 280 waits for application 260, in block 400, to register a specified event. After the specified event is registered, communication protocol stack 280, in block 402, polls a memory. In block 404, the specified event may be detected based on the polled information of block 402. In block 406, the write event is detected, for example, when the memory of the communication protocol stack 280 (i.e., the send queue) is available to accept a sufficient amount of data. The data may be transmitted from application 260. If the polled information of block 404 is not satisfactory (i.e., the specified event has not occurred), then communication protocol stack 280 continues to poll the memory, as in block 402.

In FIG. 5, communication protocol stack 280 waits for application 260 to register a specified event, as indicated in block 500. During this time, an interrupt notice may be disabled. As such, the interrupt notice cannot trigger or be triggered. After the specified event is registered, as in block 500, the interrupt notice, in block 502, may be triggered based on the occurrence of the specified event. The read event, for example, occurs when data is written into the memory of communication protocol stack 280 (i.e., the receive queue). Thus, in block 504, the read event is detected by communication protocol stack 280 when it receives the interrupt notice, which was triggered due to the occurrence of the event. The data stored in the memory of the communication protocol stack 280 may be from the communication network. Further, for the read event, the stored data may be transmitted to application 260.

Last, the close event is detected when a socket is available for re-use because, for example, a data link connection, such as the transport layer, is terminated.

The following examples of an asynchronous connection (see FIG. 6) and an asynchronous input (see FIG. 7) are provided to illustrate the use of asynchronous event notification.

Figure 6:
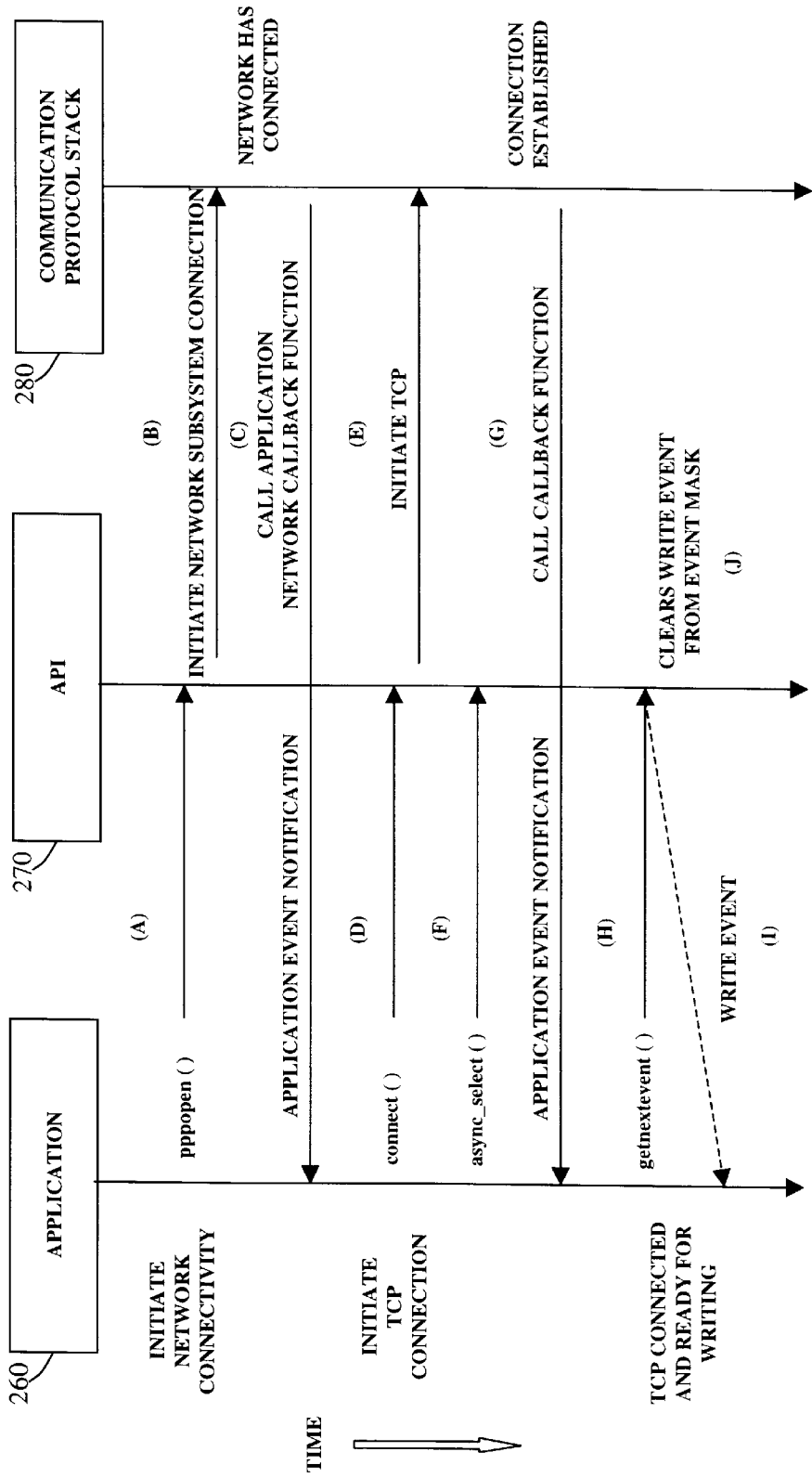
FIG. 6 is a block diagram depicting an asynchronous connection.

Referring to FIG. 6, both communication protocol stack 280 is entered and the callback functions are specified through the call to function open_netlib( ). The call to function pppopen( )(A) initiates the network subsystem connection(B). After the network subsystem connection has been established, the callback function is invoked(C) to report the availability of the network subsystem.

Assuming that a socket has been opened and allocated, a call to function connect( )(D) initiates a TCP connection(E). Further, application 260 calls function async_select( )(F) to register the specified events to receive notification. In this example, the specified event of interest is the write event, which occurs upon establishing a connection.

Upon establishing the connection, the callback function is invoked if the specified event is registered in the mask. If it is, then the callback function is invoked(G) to provide asynchronous notification. Once application 260 is notified, it calls function getnextevent( )(H) to determine which specified event occurred(I). Also, this call clears the bit of the event (i.e., the write event) in the mask(J). Application 260 must re-register subsequent notification of the specified event through the call to function async_select( ).

Figure 7:
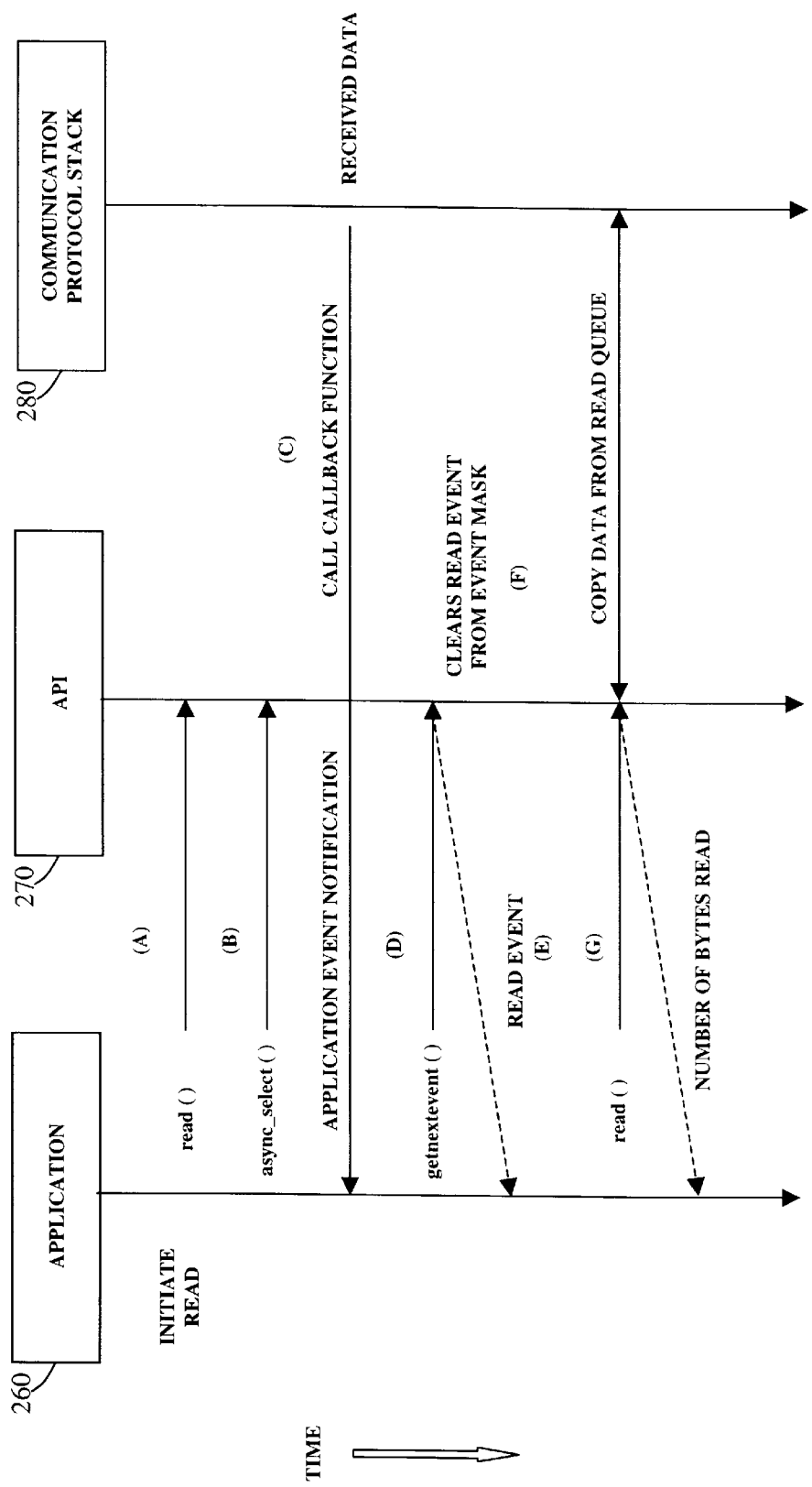
FIG. 7 is a block diagram depicting an asynchronous socket input.

In FIG. 7, an illustration of an asynchronous socket read is provided. To initiate the read, application 260 makes a call to function read( )(A). Assuming a lack of data to read, application 260 calls function async_select( )(B) to register an event (i.e., set the corresponding bit in the mask) to receive notification. In this example, the specified event of interest is the read event, which occurs when there is data to read by application 260.

Upon the storage of data in the receive queue, the callback function is invoked if the read event is specified in the mask. If it is, then the callback function is invoked(C) to provide asynchronous notification. Once application 260 is notified, it calls function getnextevent( )(D) to determine which event occurred(E). Also, this call clears the bit of the event in the mask(F). Application 260 must re-enable subsequent notification of the event through the call to function async_select( ). Last, to read the data stored in the receive queue, application 260 makes the call to function read( )(G).

Figure 8:
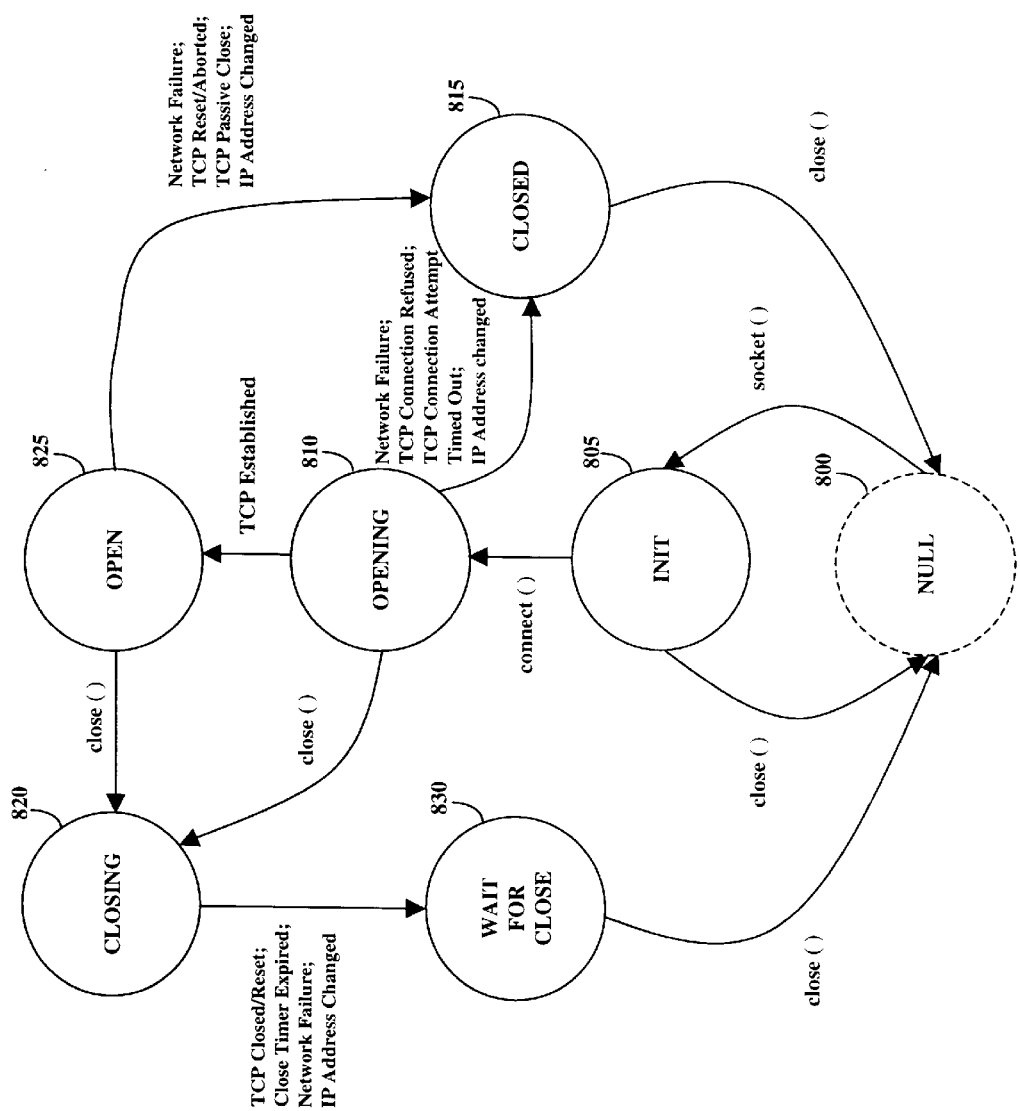
FIGS. 8–10 are state diagrams of embodiments of the present invention.
Figure 9:
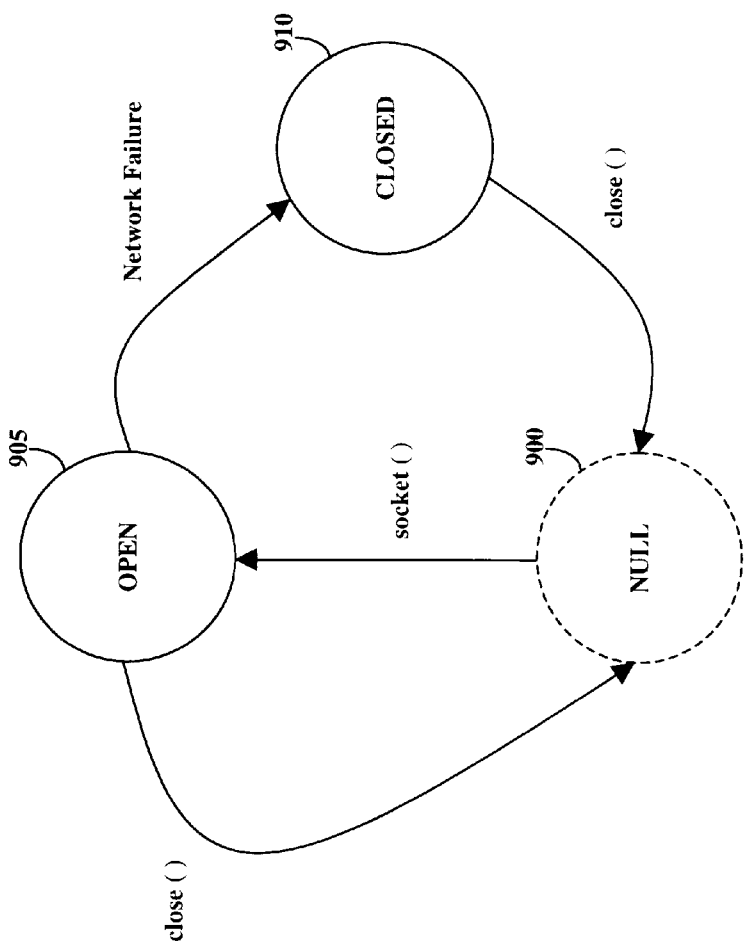
Figure 10:
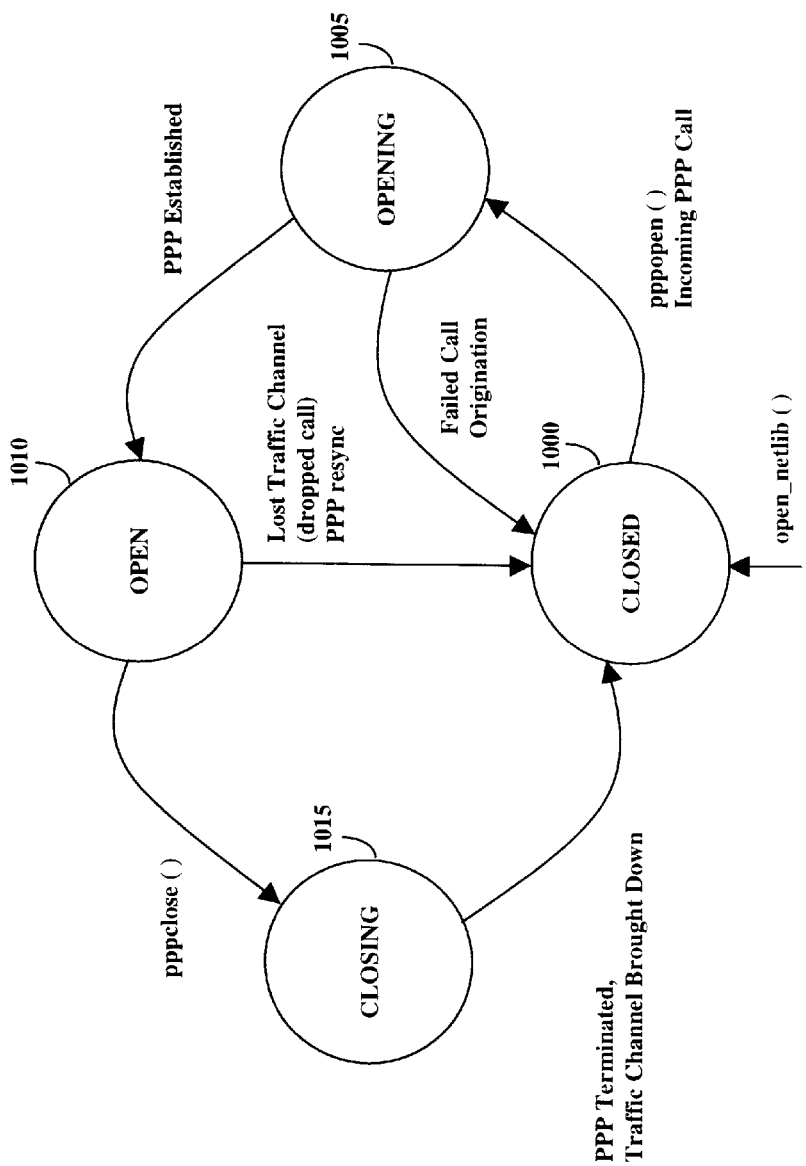

In FIGS. 8–10, state machines of embodiments of the present invention are illustrated. In FIGS. 8–9, it is assumed that communication protocol stack 280 is opened and the network subsystem connection (i.e., traffic channel, and link layer if necessary—the raw sockets may bypass the network subsystem) is established. One skilled in the art would appreciate that various names for the states are possible without departing from the scope of the present invention.

The state machine, which may asynchronously transition between states, controls (i.e., enables and disables) the specified events, such as read, write, and close. The specified events may be disabled at the start of operation and may be enabled in predetermined states to assist application 260 to identify the state of MS 110.

Also, API 270 reports specified status messages that are particular (i.e., not merely generic) to application 260 based on the state of API 270 and the type of function called by application 260. The specified status messages may reflect the state of the underlying communication network. The status messages are reported to application 260 as arguments of the function calls, for example.

In FIG. 8, for example, a state diagram for a TCP socket of API 270 is illustrated. The uninitialized socket begins in the "null" state 800. The socket does not "exist" because it has not been allocated, as of yet. The socket may be created and initialized through a call to function socket( ), which returns the socket descriptor to use with socket-related functions. After the call to function socket( ), the state machine transitions to an "initialize" state 805.

In the initialize state 805, the state machine transitions back to the null state 800 whenever the possibility of a TCP connection is terminated by a call to function close( ). The call to function close( ) releases all socket-related resources. On the other hand, a call to function connect( ) initiates the TCP connection and transitions the state machine into an "opening" state 810.

In the opening state 810, the state machine transitions to a "closed" state 815 whenever: (1) a network subsystem failure occurs, (2) a failure to establish the TCP connection, or (3) a changed IP address. Also, after a call to function close( ),which terminates the TCP connection, the state machine transitions the socket into a "closing" state 820 while the termination procedures are initiated. Last, the state machine transitions to an "open" state 825 upon the TCP connection being established.

In the open state 825, the socket is open to read and write. In particular, the write event is immediately enabled, while the read event is enabled based on whether data is stored into the memory of the communication protocol stack 280. The state machine transitions to the closed state 815 whenever:

(1) the network subsystem failure occurs; (2) the failure to establish the TCP connection; (3) an attempt to terminate the TCP connection, such as a TCP reset, a TCP aborted, or a TCP closed initiated by a network server; and (4) the change of the IP address. An application initiated TCP connection termination, such as by a call to function close( ), transitions the state machine to the closing state 820.

In the closed state 815, the read, write and close events are all asserted. After a call to function close( ), which terminates the TCP connection, the state machine transitions the socket to the null state 800, which frees up the socket and makes it available for re-use.

In the closing state 820, the state machine transitions to a "wait for close" state 830 whenever: (1) the network subsystem failure occurs; (2) the attempt to terminate the TCP connection, such as the TCP reset, or the TCP closed initiated by the network server; (3) an expiration of a timer and (4) the change of the IP address. For protection against delay in terminating the TCP connection, the API 270 implements the timer, which is activated upon the initiating of the TCP connection termination. As seen, the expiration of the timer transitions the state machine to the wait for close state 830.

In the wait for close state 830, a call to function close( ) terminates the TCP connection and transitions the state machine to the null state 800. The close event is asserted in this state 830.

Tables 1–3 illustrate specified status messages supported by API 270. In the null state (not shown in Tables 1–3), a specified status message, which is descriptive, that "no additional resources are available" may be reported to application 260.

TABLE 1

| State | Specified Status Messages for a Connect Function type |
|---|---|
| Initialize | If this were a blocking function call, the operation would block |
| Opening | Connection in progress |
| Open | Connection established |
| Closing | TCP connection does not exist due to lack of origination attempt, or the connection attempt failed |
| Wait for Close | TCP connection does not exist due to lack of origination attempt, or the connection attempt failed; or Generic network error; underlying network is not available |
| Closed | Generic network error; underlying network is not available; Connection attempt was refused due to a server reset; Connection in progress timed out; or Network level IP address changed, which caused the TCP connection to reset, due to a PPP resync |

TABLE 2

| State | Specified Status Messages for an I/O Function type |
|---|---|
| Initialize | TCP connection does not exist due to lack of origination attempt, or the connection attempt failed |
| Opening | If this were a blocking function call, the operation would block |
| Open | If this were a blocking function call, the operation would block (number of bytes read/written) |
| Closing | TCP connection does not exist due to lack of origination attempt, or the connection attempt failed |
| Wait for Close | TCP connection does not exist due to lack of origination attempt, or the connection attempt failed; or Generic network error; underlying network is not available |
| Closed | Generic network error; underlying network is not available; Server reset the connection; receipt of a server reset; TCP connection aborted due to a time-out or other reason; or |

TABLE 2-continued

| State | Specified Status Messages for an I/O Function type |
|---|---|
| | TCP connection does not exist due to lack of origination attempt, or the connection attempt failed |

TABLE 3

| State | Specified Status Messages for a Close Function type |
|---|---|
| Initialize | Success-no error condition reported |
| Opening | If this were a blocking function call, the operation would block |
| Open | If this were a blocking function call, the operation would block |
| Closing | If this were a blocking function call, the operation would block |
| Wait for Close | Success-no error condition reported |
| Closed | Success-no error condition reported |

By way of example, FIG. 9 illustrates a state diagram for a UDP socket of API 270. The uninitialized socket begins in a "null" state 900. As noted above with respect to the null state 800, the socket does not "exist" because it has not been allocated. The socket may be created and initialized through a call to function socket( ), which returns the socket descriptor to use with socket-related functions. After the call to function socket( ), the state machine transitions to an "open" state 905.

In the open state 905, the socket is open to read and write. In particular, the write event is immediately enabled, while the read event is enabled based on whether data is stored into the memory of the communication protocol stack 280. The state machine transitions to a "closed" state 910 whenever the network subsystem failure occurs. An application initiated UDP connection termination, such as by a call to function close( ), transitions the state machine to the null state 900.

In the closed state 910, the read, write, and close events are all enabled. After a call to function close( ), which terminates the UDP connection, the state machine transitions the socket to the null state 900, which frees up the socket and makes it available for re-use.

Tables 4–6 illustrate specified status messages supported by API 270. In the null state (not shown in Tables 4–6), the specified status message that "no additional resources are available," as stated above, may be reported to application 260.

TABLE 4

| State | Specified Status Messages for a Connect Function type |
|---|---|
| Open | Success-no error condition reported |
| Closed | Generic network error; underlying network is not available |

TABLE 5

| State | Specified Status Messages for an I/O Function Type |
|---|---|
| Open | If this were a blocking function call, the operation would block (number of bytes read/written) |
| Closed | Generic network error; underlying network is not available |

TABLE 6

| State | Specified Status Messages for a Close Function Type |
|---|---|
| Open | Success-no error condition reported |
| Closed | Success-no error condition reported |

FIG. 10 illustrates a state diagram to control the network subsystem, such as the traffic channel (i.e., Um) and the link-layer (i.e., PPP 206). A call to function open_netlib( ) opens the network subsystem, and initializes a socket into a "closed" state 1000. A call to function pppopen( ) initiates the network subsystem connection, which transitions the socket to an "opening" state 1005. Also, a page to the MS 110 by an incoming PPP call transitions the socket to the opening state 1005. In both cases, upon successful negotiation, the MS 110 attempts to synchronize and establish both RLP and PPP across the traffic channel.

In the opening state 1005, the socket transitions to an "open" state 1010 upon the network subsystem connection being established. On the other hand, the socket transitions back to the closed state 1000 if the network subsystem connection is not established.

In the open state 1010, the callback function is invoked to identify to application 1060 specified events, such as read, write, and close, that are enabled. At this time, the MS 110 can communicate through the traffic channel. The socket, however, transitions to the closed state 1000 whenever network subsystem failure occurs, which invokes the callback function. An application initiated network subsystem connection termination, such as by a call to function close( ), transitions the socket to a "closing" state 1015.

In the closing state 1015, the socket transitions to the closed state 1000 whenever the network subsystem connection is terminated. In the closed state 1000, the callback function is invoked to identify to application 260 specified events that are enabled.

Table 7 illustrates specified status messages that correspond to particular function calls, and that are supported by API 270.

TABLE 7

| Function Call (and description) | Specified Status Messages |
|---|---|
| socket ( ) creates a socket and returns a socket descriptor | Address not supported; Invalid Application Identifier; Protocol is wrong type for socket; Invalid or unsupported socket parameter; Protocol not supported; or No more socket resources available |
| connect ( ) initiates TCP connection | If this were a blocking function call, the operation would block; Invalid socket descriptor; Connection attempt was refused due to receipt of a server reset; Connection timed out; Application buffer not part of valid address space; invalid size specified for address length or message length; Network level IP address changed, which caused the TCP connection to reset, due to a PPP resync; Connection in progress; Socket descriptor already connected; Generic network error; underlying network is unavailable; Invalid server address specified; Address already in use; or Destination Address Required |
| pppopen ( ) establishes network connection | If this were a blocking function call, the operation would block; Invalid application identifier specified; or Termination of network connection in progress |
| net_ioctl ( ) sets network characteristics | Invalid application identifier specified; Invalid request or parameter; Network connection established; or Network connection in progress |
| open_netlib ( ) opens communication protocol stack | No more applications available-maximum number of open applications exceeded |
| close_netlib ( ) closes communication protocol stack | Invalid application identifier specified; There are existing, allocated sockets; or Network connection is still established |
| bind ( ) for client sockets, attaches a local address and port value to the socket | Invalid socket descriptor specified; Invalid or unsupported operation specified; Address already in use; Invalid operation; or Invalid address parameter specified |
| close ( ) closes a socket to free it for re-use | Invalid socket descriptor specified; or If this were a blocking function call, the operation would block |
| pppclose ( ) closes network connection | If this were a blocking function call, the operation would block; Invalid application identifier specified; or Termination of network connection in progress |
| netstatus ( ) reports status of network connection | Invalid application identifier specified; Underlying network is unavailable; Network connection established and available; Network connection in progress; Termination of network connection in progress; No CDMA (i.e., traffic channel) service available; CDMA service available, but origination failed because base station does not support service option; or CDMA service available, but origination failed; however, not because base station does not support the service option |
| async_select ( ) registers specified events for a particular socket | Invalid socket descriptor specified |
| getnextevent ( ) get the next socket descriptor and events that have occurred | Invalid socket descriptor specified; or Invalid application identifier specified |
| write ( ) write a specified number of bytes-contiguous or non-contiguous buffers | Invalid socket descriptor specified; No existing TCP connection; Server reset the TCP connection; TCP connection aborted due to timeout or other failure; Network level IP address changed, which caused the TCP connection to reset, due to a PPP resync; TCP connection closed; Network unavailable; Application buffer not valid part of address space; or No free buffers available for writing |
| read ( ) read a specified number of bytes-contiguous or non-contiguous buffers | Invalid socket descriptor specified; No existing TCP connection; Server reset the TCP connection; TCP connection aborted due to timeout or other failure; Network level IP address changed, which caused the TCP connection to reset, due to a PPP |

TABLE 7-continued

| Function Call (and description) | Specified Status Messages |
|---|---|
| | resync; |
| | TCP connection closed; |
| | Network unavailable; |
| | Application buffer not valid part of address space; |
| | No free buffers available for reading; or |
| | End of file marker received |
| sendto () send a specified number of bytes | Invalid socket descriptor specified; Address family not supported; No free buffers available for writing; Network unavailable; Application buffer not valid part of address space; Specified option not supported; or Destination address requested |
| recvfrom () reads a specified number of bytes | Invalid socket descriptor specified; Address family not supported; No free buffers available for writing; Network unavailable; Application buffer not valid part of address space; or Specified option not supported |

In another embodiment, a machine may read a machine-readable medium comprising encoded information, such as encoded software code, to cause the processes described above that detects a specified event. The machine-readable medium may accept the encoded information from a storage device, such as a memory or a storage disk, or from the communication network. Also, the machine-readable medium may be programmed with the encoded information when the medium is manufactured. The machine may comprise at least one of application 260, communication protocol stack 280, and API 270, while the machine-readable medium may comprise a memory or a storage disk.

Although this invention has been shown in relation to particular embodiments, it should not be considered so limited. Rather, the invention is limited only by the scope of the appended claims and their equivalents.

What is claimed is:

1. A method for a mobile station communication protocol stack to detect a specified event, the method comprising:
   communicating between the mobile station communication protocol stack and a communication network;
   communicating between the mobile station communication protocol stack and a mobile station application through a mobile station application interface;
   polling, by the mobile station communication protocol stack, a memory whenever the mobile station application registers the specified event; and
   detecting, by the mobile station communication protocol stack, the specified event based on the polling.

2. The method of claim 1, further comprising detecting, by the mobile station communication protocol stack, the specified event whenever the memory is available to accept a sufficient amount of data.

3. The method of claim 2, wherein the data is transmitted from the mobile station application.

4. The method of claim 1, wherein the specified event is at least one of a write, read and close events.

5. The method of claim 1, further comprising,
   registering, by the mobile station application, the specified event, and
   disabling, by the mobile station application, the specified event.

6. A method for a mobile station communication protocol stack to detect a specified event, the method comprising:
   communicating between the mobile station communication protocol stack and a communication network;
   communicating between the mobile station communication protocol stack and a mobile station application through a mobile station application interface;
   registering, by a mobile station application, the specified event;
   triggering an interrupt notice whenever the specified event occurs; and
   detecting, by the mobile station communication protocol stack, the specified event by the interrupt notice.

7. The method of claim 6, wherein the specified event occurs whenever data is written into a memory.

8. The method of claim 6, wherein the specified event is at least one of a write, read and close events.

9. The method of claim 6, further comprising disabling, by the mobile station application, the specified event.

10. An apparatus for detecting a specified event, the apparatus comprising:
    a mobile station communication protocol stack to communicate with a communication network;
    a mobile station application interface to facilitate communications between the mobile station communication protocol stack and a mobile station application; and
    a memory to poll by the mobile station communication protocol stack whenever the mobile station application registers the specified event,
    wherein the mobile station communication protocol stack is adapted to detect the specified event based on the polls.

11. The apparatus of claim 10, wherein the mobile station application interface is adapted to detect the specified event whenever the memory is available to accept a sufficient amount of data.

12. The apparatus of claim 10, wherein the specified event is at least one of a write, read and close events.

13. The apparatus of claim 10, wherein the data is transmitted from the mobile station application.

14. The apparatus of claim 10, wherein the mobile station application is adapted to disable the specified event.

15. An apparatus for detecting a specified event, the apparatus comprising:
    a mobile station communication protocol stack to communicate with a communication network; and
    a mobile station application interface to facilitate communications between the mobile station communication protocol stack and a mobile station application,
    wherein the mobile station application is adapted to register the specified event,
    wherein an interrupt notice is adapted to trigger whenever the specified event occurs, and
    wherein the mobile station communication protocol stack is adapted to detect the specified event by the interrupt notice.

16. The apparatus of claim 15, wherein the specified event is at least one of a write, read and close events.

17. The apparatus of claim 15, wherein the specified event occurs whenever data is written into a memory.

18. The apparatus of claim 15, wherein the mobile station application is adapted to disable the specified event.

19. A machine-readable medium comprising encoded information, which when read by a machine causes the processes of:
    communicating between a mobile station communication protocol stack and a communication network;

communicating between the mobile station communication protocol stack and a mobile station application through a mobile station application interface;

polling, by the mobile station communication protocol stack, a memory whenever the mobile station application registers a specified event; and detecting, by the mobile station communication protocol stack, the specified event based on the polling.

20. The machine-readable medium of claim 19, further comprising detecting, by the mobile station communication protocol stack, the specified event whenever the memory is available to accept a sufficient amount of data.

21. The machine-readable medium of claim 19, wherein the specified event is at least one of a write, read and close events.

22. The machine-readable medium of claim 20, wherein the data is transmitted from the mobile station application.

23. The machine-readable medium of claim 19, further comprising, registering, by the mobile station application, the specified event, and disabling, by the mobile station application, the specified event.

24. A machine-readable medium comprising encoded information, which when read by a machine causes the processes of:

communicating between a mobile station communication protocol stack and a communication network;

communicating between the mobile station communication protocol stack and a mobile station application through a mobile station application interface;

registering, by a mobile station application, a specified event;

triggering an interrupt notice whenever the specified event occurs; and detecting, by the mobile station communication protocol stack, the specified event by the interrupt notice.

25. The machine-readable medium of claim 24, wherein the specified event occurs whenever data is written into a memory.

26. The machine-readable medium of claim 24, wherein the specified event is at least one of a write, read and close events.

27. The machine-readable medium of claim 24, further comprising disabling, by the mobile station application, the specified event.

* * * * *